(12) United States Patent
Piontek et al.

(10) Patent No.: US 10,295,101 B2
(45) Date of Patent: May 21, 2019

(54) PUSH PLUG TYPE LINE STOP BRANCH ASSEMBLY

(71) Applicant: Total Piping Solutions, Inc., Olean, NY (US)

(72) Inventors: Daryl M. Piontek, Great Valley, NY (US); Richard J. Fontes, East Aurora, NY (US)

(73) Assignee: Total Piping Solutions, Inc., Olean, NY (US)

( * ) Notice: Subject to any disclaimer, the term of this patent is extended or adjusted under 35 U.S.C. 154(b) by 0 days.

(21) Appl. No.: 15/492,407

(22) Filed: Apr. 20, 2017

(65) Prior Publication Data
US 2018/0306369 A1 Oct. 25, 2018

(51) Int. Cl.
*F16L 55/10* (2006.01)
*F16L 55/11* (2006.01)
*F16L 19/025* (2006.01)
*F16L 41/02* (2006.01)
*F16L 41/06* (2006.01)

(52) U.S. Cl.
CPC ............. *F16L 55/11* (2013.01); *F16L 19/025* (2013.01); *F16L 55/1108* (2013.01); *F16L 41/021* (2013.01); *F16L 41/06* (2013.01)

(58) Field of Classification Search
CPC ........................................ F16L 55/11
USPC .............................................. 138/89, 92, 94
See application file for complete search history.

(56) References Cited

U.S. PATENT DOCUMENTS

| | | | |
|---|---|---|---|
| 2,797,948 A * | 7/1957 | Tangard | F16J 13/08 220/315 |
| 3,132,881 A | 5/1964 | Corey | |
| 3,766,947 A * | 10/1973 | Osburn | F16L 55/11 138/89 |
| 4,344,460 A * | 8/1982 | Galos | F16L 55/11 138/89 |
| 5,188,402 A | 2/1993 | Colgate et al. | |
| 5,374,087 A | 12/1994 | Powers | |
| 5,450,765 A * | 9/1995 | Stover | F16L 55/11 138/90 |
| 5,590,913 A | 1/1997 | Morris et al. | |
| 5,676,174 A | 10/1997 | Berneski, Jr. et al. | |
| 5,904,377 A * | 5/1999 | Throup | F16L 55/11 138/89 |
| 6,227,234 B1 | 5/2001 | Powers | |
| 6,776,184 B1 * | 8/2004 | Maichel | F16L 41/06 137/318 |

(Continued)

FOREIGN PATENT DOCUMENTS

CA 2662049 C 11/2015
EP 2369215 B1 12/2010

OTHER PUBLICATIONS

2LBIN; JCM Industries Linestop 440 Fitting; Hot Tapping Machines; Website: http://www2lbin.com/linestop-440-AWWA-Fittings.shtml; Apr. 25, 2016.

*Primary Examiner* — James F Hook
(74) *Attorney, Agent, or Firm* — Phillips Lytle LLP; David L. Principe

(57) ABSTRACT

A push plug type line stop branch assembly for use with a tapping sleeve fitting on a pipe. The branch assembly has a bore defined therein for receive a plug. The inner walls of the branch assembly defining the bore are shaped in part to provide a shoulder for receiving a lip on the plug.

20 Claims, 5 Drawing Sheets

(56) References Cited

U.S. PATENT DOCUMENTS

| | | | |
|---|---|---|---|
| 7,070,209 B2 | 7/2006 | Collins | |
| 7,225,827 B2 * | 6/2007 | Maichel | F16K 3/0272 |
| | | | 137/318 |
| 7,353,839 B2 * | 4/2008 | Calkins | F16K 1/34 |
| | | | 137/317 |
| 8,176,929 B1 | 5/2012 | Collins | |
| 8,286,655 B2 | 10/2012 | Farrelly | |
| 8,627,843 B2 * | 1/2014 | Ries | F16L 55/105 |
| | | | 137/315.29 |
| 9,829,141 B2 * | 11/2017 | Vazzana | F16L 55/11 |
| 2013/0032238 A1 * | 2/2013 | Butler | F16L 41/16 |
| | | | 138/89 |
| 2015/0369416 A1 | 12/2015 | Farrelly | |

\* cited by examiner

PUSH PLUG TYPE LINE STOP BRANCH ASSEMBLY

TECHNICAL FIELD

The present invention relates generally to the field of pipe fittings, and more particularly to an improved push plug and branch assembly for use with a tapping sleeve fitting.

BACKGROUND ART

It is sometimes desirable to stop fluid flow through a pipeline without the assistance of a valve. For example, a section of pipeline may not be controlled by an upstream valve that will allow fluid flow to be shut off during pipeline repairs. Alternatively, the pipeline may include a valve, but that valve may be broken or otherwise not fully functioning. Accordingly, plugging may be used to temporarily shut off the fluid flow such that needed repairs or other servicing operations can be made to a section of pipeline. In one type of plugging operation, two halves of a tapping sleeve are placed around a pipe at a point along the pipeline where fluid flow is to be shut off. The two halves of the tapping sleeve are typically bolted together. The upper half of the sleeve supports a branch assembly to which a temporary valve is attached. An operator then extends a tapping machine through the temporary valve and the branch assembly and taps an aperture into the wall of the underlying pipe. The temporary valve is used to prevent fluid escape after the tapping machine is removed. Next, a plugging machine is used to extend a plug through the temporary valve, the branch assembly, and the aperture in the pipe wall. Once the plug is in place within the inner walls of the pipe, the fluid flow is stopped and repairs or other service work can be performed downstream of the plug. When not in use for tapping and plugging operations, a push plug with a seal is inserted into the branch to provide a seal of the opening in the branch.

BRIEF SUMMARY OF THE INVENTION

With parenthetical reference to corresponding parts, portions or surfaces of the disclosed embodiment, merely for the purposes of illustration and not by way of limitation, the present invention provides an improved push plug type line stop branch assembly for use with a tapping sleeve (70) disposed on a pipe (73). The assembly comprises a branch (13) that is configured and arranged for attachment to the tapping sleeve (70). The branch (13) has a body (14) with a flange (16) extending outward from the top of the body (14). The branch (13) has a bore (19) defined therein. The bore (19) is defined by an inner wall having a first wall section (46) having an inside diameter and a second wall section (49) having an inside diameter smaller than the inside diameter of the first wall section (46). A horizontal wall section (52) extends between the first and second wall sections (46, 49) to form a shoulder. The inner wall further comprises a transition wall section (58) with a decreasing inside diameter and a third wall section (67) disposed adjacent to the transition wall section (58). The third wall section (67) defines a sealing bore.

A plug (10) has a body (43) with a first diameter. The plug (10) has a lip (40) with a second diameter that is greater than the first diameter. The plug (10) has a first groove (34) and a second groove (39) defined therein. The plug (10) is configured and arranged to slide into the bore (19) of the branch (13) in a longitudinal direction until the lip (40) on the plug (10) engages with the shoulder in the branch (13).

An O-ring (31) is disposed in the first groove (34) in the plug (10). The O-ring (31) is configured and arranged to provide a seal inside the bore (19) when the plug (10) is inserted into the bore (19) of the branch (13) such that the lip (40) engages the shoulder.

At least one set screw (37) is configured and arranged to extend through the branch (13) into the second groove (39) in the plug (10) when the plug (10) is inserted into the branch (13) such that the lip (40) engages with the shoulder.

In another aspect of the invention, a push plug type line stop branch assembly is provided for use with a tapping sleeve (70) disposed on a pipe (73). The assembly comprises a branch (13) configured and arranged for attachment to the tapping sleeve (70). The branch (13) has a body (14) with a flange (16) extending outward from the top of the body (14). The branch (13) has a bore (19) defined therein. The bore (19) is defined by an inner wall having a first wall section (46) having an inside diameter and a second wall section (49) having an inside diameter smaller than the inside diameter of the first wall section (46). A generally horizontal wall section (52) extends between the first and second wall sections (46, 49) to form a shoulder near the entrance to the bore (19).

A plug (10) having a body (43) with a first diameter is provided. The plug (10) has a lip (40) with a second diameter that is greater than the first diameter. The plug (10) has a first groove (34) and a second groove (39) defined therein. The plug (10) is configured and arranged to slide into the bore (19) of the branch (13) in a longitudinal direction until the lip (40) on the plug (10) engages with the shoulder in the branch (13).

An O-ring (31) may be disposed in the first groove (34) in the plug (10). The O-ring (31) may be configured and arranged to provide a seal inside the bore (19) when the plug (10) is inserted into the bore (19) of the branch (13) such that the lip (40) engages the shoulder.

At least one set screw (37) is configured and arranged to extend through the branch (13) into the second groove (39) in the plug (10) when the plug (10) is inserted into the branch (13) such that the lip (40) engages with the shoulder.

In another aspect of the invention, a push plug type line stop branch assembly is provided for use with a tapping sleeve (70) disposed on a pipe (73). The assembly comprises a branch (13) configured and arranged for attachment to the tapping sleeve (70). The branch (13) has a body (14) with a flange (16) extending outward from the top of the body (14). The branch (13) has a bore (19) defined therein. The bore (19) is defined by an inner wall having a first wall section (46) having an inside diameter and a second wall section (49) having an inside diameter smaller than the inside diameter of the first wall section (46). A generally horizontal wall section (52) extends between the first and second wall sections (46, 49) to form a shoulder near the entrance to the bore (19).

A plug (10) has a body (43) with a first diameter. The plug (10) has a lip (40) with a second diameter that is greater than the first diameter. The plug (10) is configured and arranged to slide into the bore (19) of the branch (13) in a longitudinal direction until the lip (40) on the plug (10) engages with the shoulder in the branch (13).

DETAILED DESCRIPTION OF THE PREFERRED EMBODIMENTS

Figure 1:
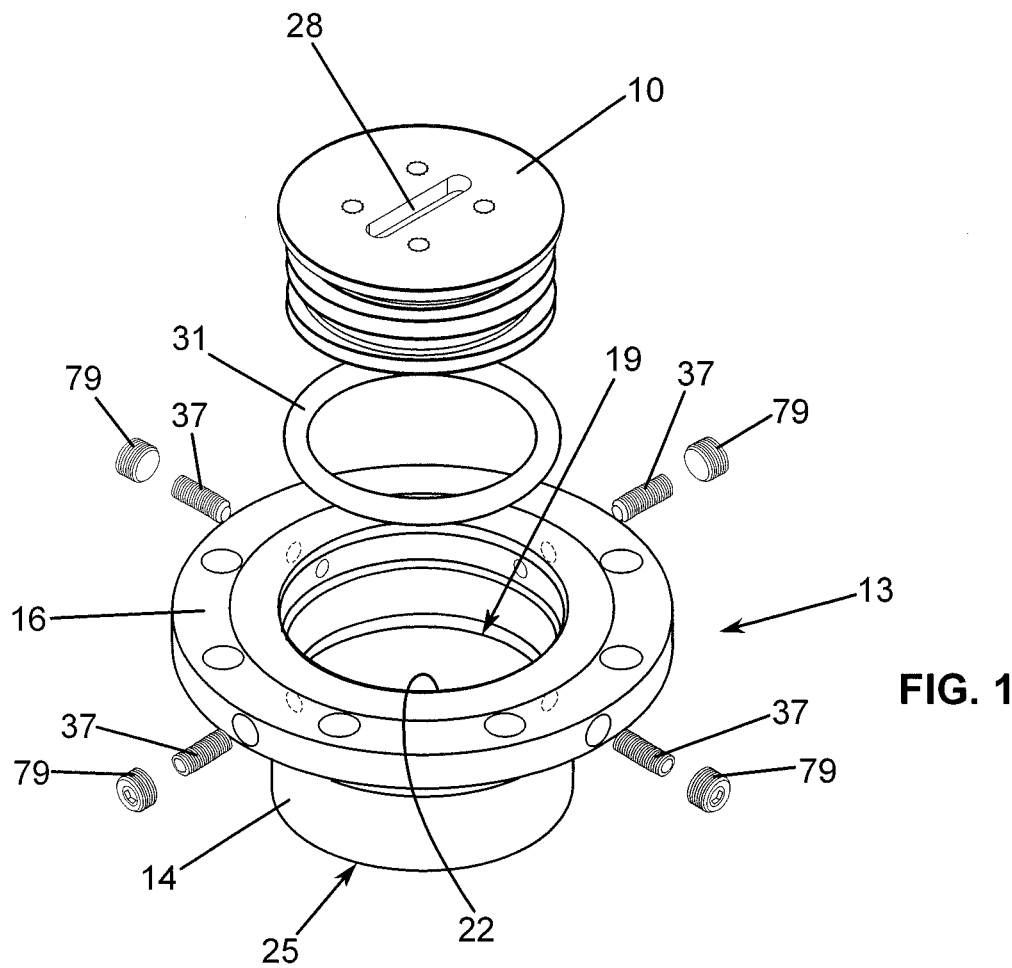
FIG. 1 is an exploded perspective view of a push plug and branch assembly.

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, proportion, degree, etc.) together with the specification, and are to be considered a portion of the entire written description of this invention. As used in the following description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

Referring generally to FIGS. 1-5, this invention provides an improved push plug 10 and branch 13 for use with a tapping sleeve 70 disposed on a pipe 73. A first embodiment of the plug 10 and branch 13 is shown in FIG. 1. The branch 13 may have a hollow cylindrical body 14 with a flange 16 extending outward from the top of the body 14. In the center of the flange 16, a bore 19 extends from a first opening 22 in the flange 16 to a second opening 25 disposed at the bottom of the body 14 of the branch 13. The bore 19 may be generally cylindrical in shape and may extend longitudinally from the top to the bottom of the branch 13.

The push plug 10 may be generally cylindrical in shape in order to mate with and form a seal inside the bore 19. The push plug 10 may be provided with a slot 28 defined in the upper surface. The slot 28 may receive a tool 88 (FIG. 5) for positioning the plug 10 inside the bore 19. An O-ring 31 may be provided for sealing the plug 10 against the inside wall 67 (FIG. 3A) of the bore 19. The O-ring 31 may be received inside a first annular groove 34 (FIG. 3A) defined in the plug 10. A plurality of set screws 37 may be used to secure the plug 10 in position inside the bore 19 and to prevent the plug 10 from exiting from the bore 19. The set screws 37 may engage with a second annular groove 39 (FIG. 3A) defined in the plug 10.

Figure 2:
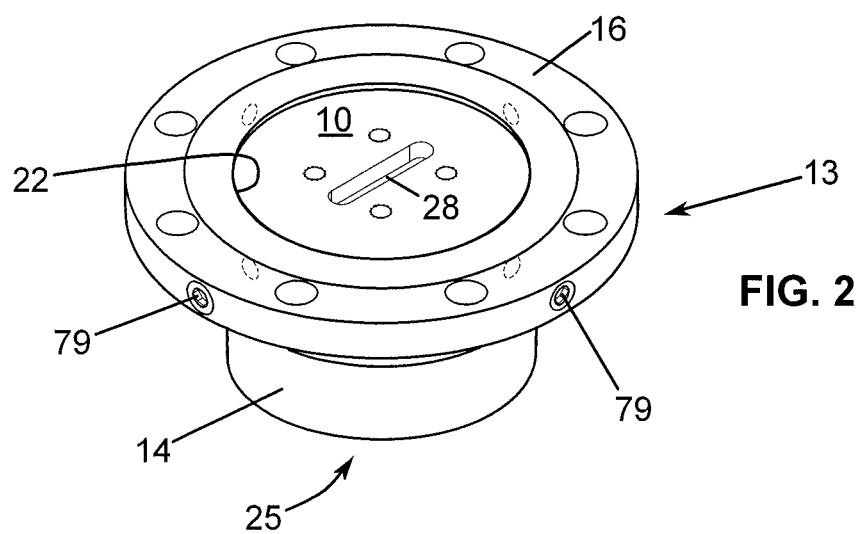
FIG. 2. is a perspective view of the push plug and branch assembly of FIG. 1 after assembly.

Turning to FIG. 2, the branch 13 is shown with the plug 10 installed therein and secured by the set screws 37. This position corresponds to the position where access to the pipe 73 is established, but the branch 13 is not in use for tapping and plugging operations.

Figure 3A:
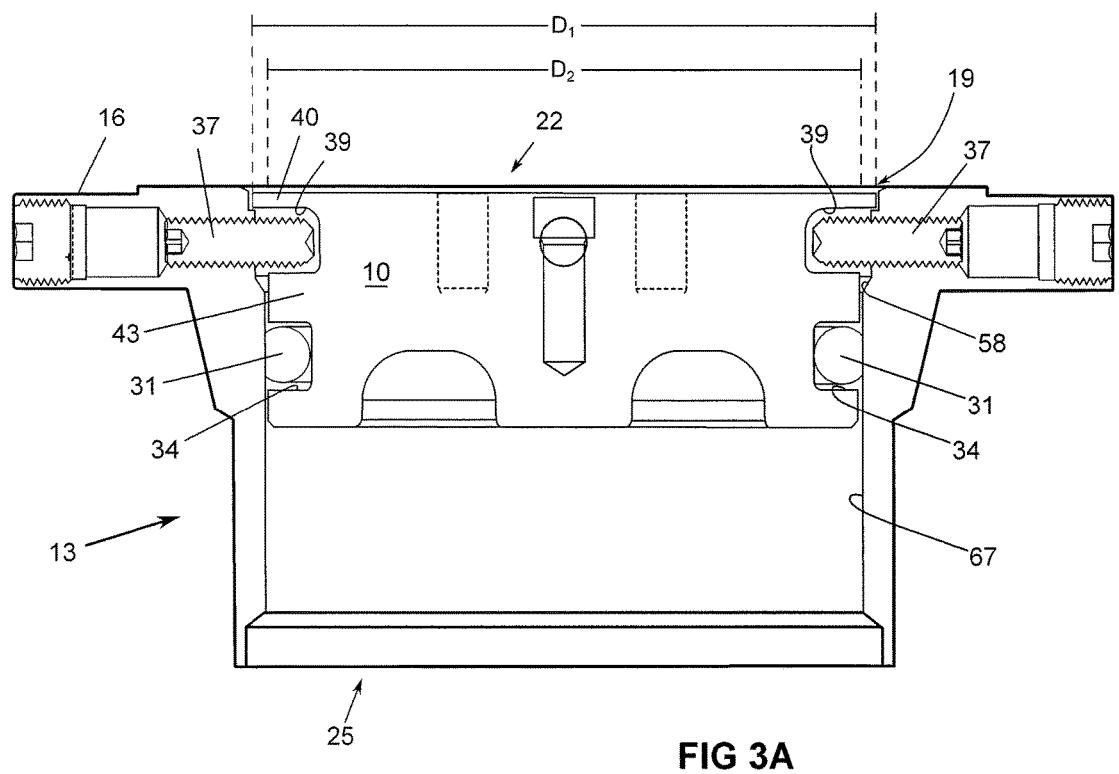
FIG. 3A is a sectional side elevational view of the push plug and branch assembly of FIG. 2.
Figure 3B:
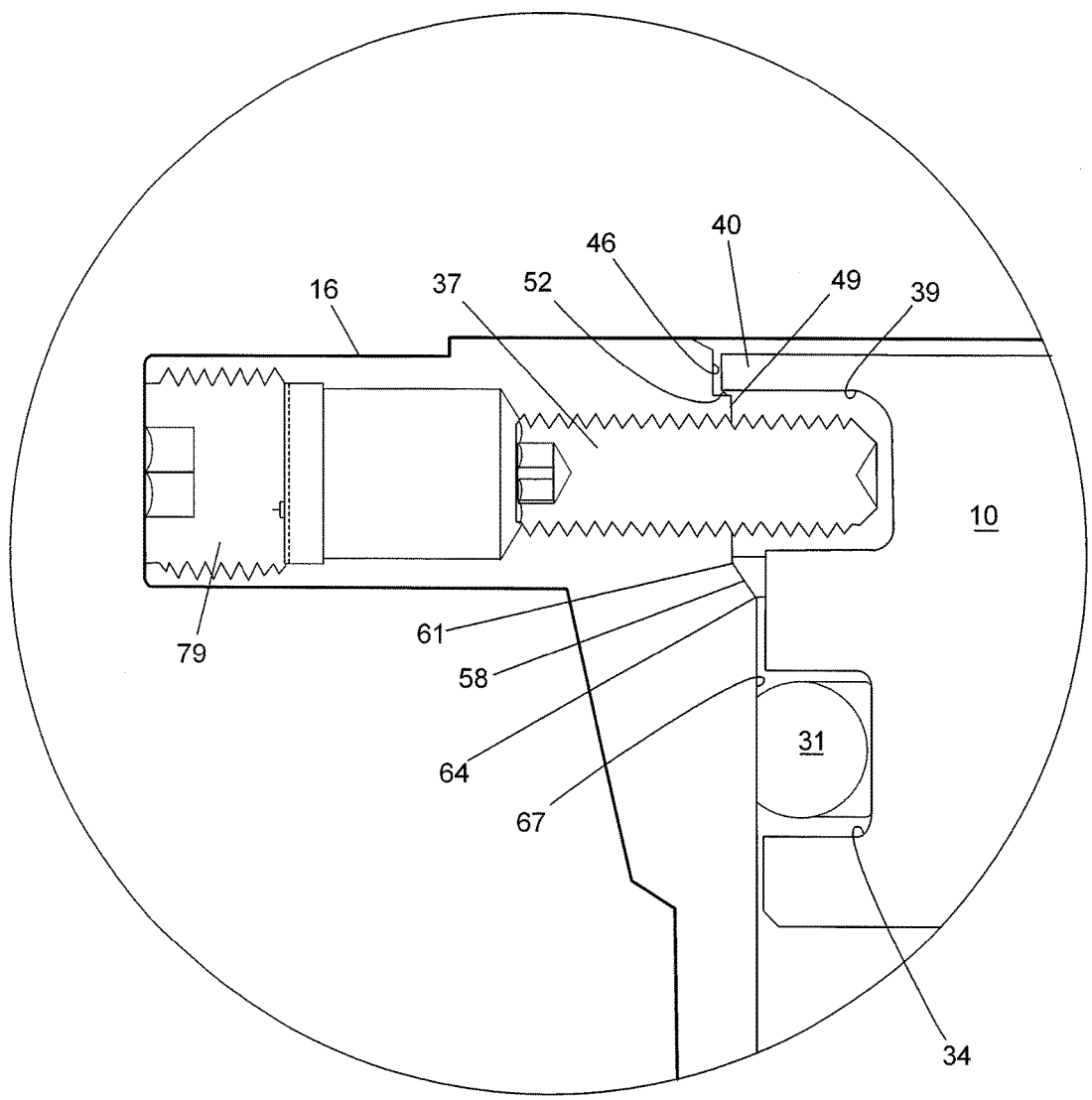
FIG. 3B is an enlarged view of a portion of FIG. 3A.

In FIGS. 3A-3B, the branch 13 is shown in cross-section with a plug 10 inserted in the bore 19. The plug 10 may be provided with a lip 40. The lip 40 is formed by a section near the top of the plug 10 that has a larger diameter $D_1$ than the diameter $D_2$ of the remainder of the body 43 of the plug 10.

Turning to FIG. 3B, the bore 19 has an inner wall with a first wall section 46. A second wall section 49 has a smaller inside diameter than the first wall section 46 and is disposed adjacent to the first wall section 46. A horizontal wall section 52 extends between the top of the second wall section 49 and the bottom of the first wall section 46. The horizontal wall section 52 defines an annular shoulder. The second wall section 49 extends downward to a transition wall section 58. In the transition wall section 58, the inside diameter of the wall decreases from the top 61 of the transition wall section 58 to the bottom 64 of the transition wall section 58. The bottom 64 of the transition wall section 58 intersects with a third wall section 67 having an inside diameter smaller than the second wall section 49. When the plug 10 is inserted into the bore 19, the O-ring 31 passes through the larger inside diameter first wall section 46, the second wall section 49, and the transition wall section 58 and is compressed in the third wall section 67 which forms a sealing bore surface for engaging with the O-ring 31. The larger diameters of the first wall section 46, the second wall section 49, and the transition wall section 58 provide for reduced friction during insertion of the plug 10 until it reaches the sealing bore surface of the third wall section 67.

Figure 4:
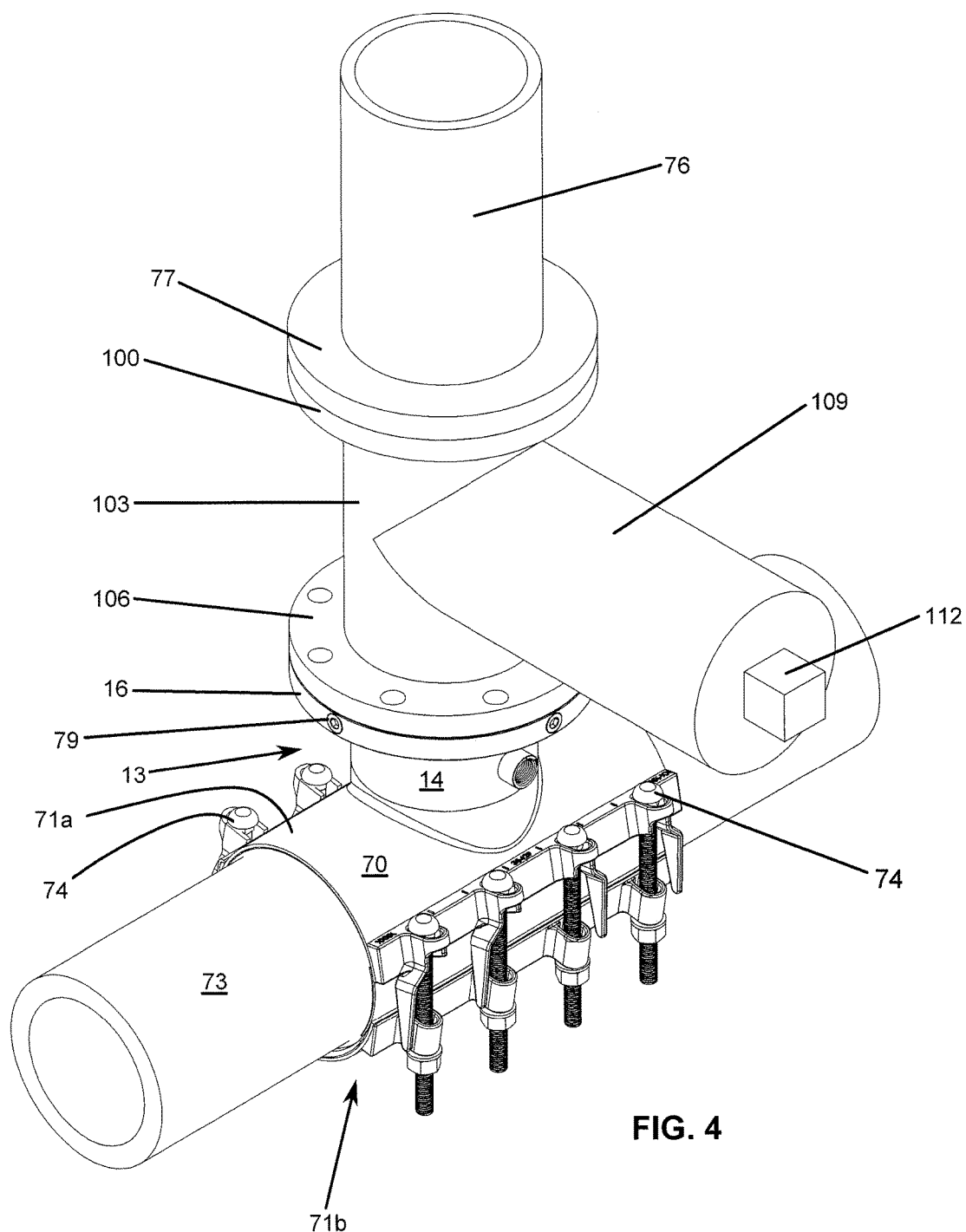
FIG. 4 is a perspective view of an installation housing, a gate valve body, and a branch connected to a tapping sleeve on a pipe.

The horizontal wall section 52 forming an annular shoulder engages with the lip 40 and thereby prevents the plug 10 from passing all the way through the branch assembly 13 into the inside of the pipe 73 (FIG. 4). Also, when the lip 40 engages with the horizontal wall section 52, the plug 10 is inserted far enough such that the set screws 37 align with the groove 39 in the plug 10. In this position, the set screws 37 may be inserted through the flange 16 and the bore 19 into the groove 39 in the plug 10.

The flange 16 and branch 13 are preferably constructed as a single forged item which eliminates the need for welding the flange 16 to the branch 13.

Figure 5:
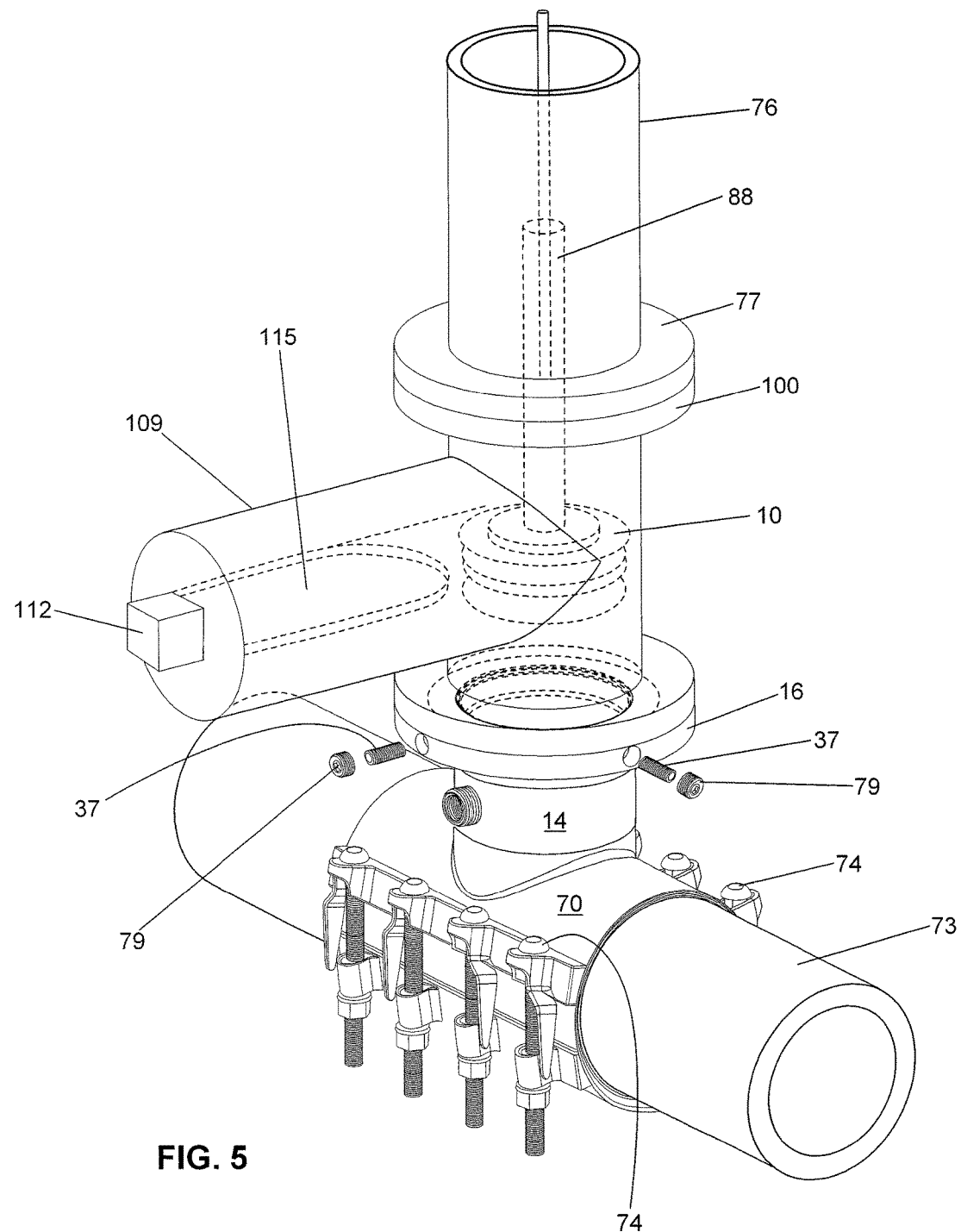
FIG. 5 is a perspective view of an installation housing, a gate valve body, and a branch connected to a tapping sleeve on a pipe with a push plug being installed therein.

Turning to FIGS. 4-5, the branch 13 may be attached to any size tapping sleeve 70. The extended forged neck of the branch 13 may be attached to the tapping sleeve 70 with a full penetration weld. The tapping sleeve 70 may comprise two sections 71a and 71b disposed on opposite sides of a pipe 73 and may be connected by fasteners 74. Once the tapping sleeve 70 is installed on the pipe 73 and after a tap has been performed on the pipe 73, the push plug 10 is inserted into the bore 19 of the branch 13 through an installation housing 76 that has a flange 77 that is mounted to the top flange 100 of the gate valve body 103. The gate valve body 103 also includes a lower flange 106 that mounts to the flange 16 of branch 13. A gate valve housing 109 extends from body 103. A square nut 112 may be provided for access to the gate valve 115 (FIG. 5) inside the housing 109. The gate valve 115 is a valve having a horizontal sliding member as will be evident to those or ordinary skill in the art based on this disclosure. A tool 88 (FIG. 5) is used to push the plug 10 downward until the lip 40 engages with the horizontal wall section 52 as described above. The O-ring 31 seals against the inside of the bore 19 as described above. Once the plug 10 is inserted, set screws 37 may be screwed into the branch 13 until they bottom out in the groove 39 in the plug 10 which prevents the plug 10 from exiting from the bore 19. Once the set screws 37 are installed, plugs 79 may be inserted into the ends of the openings for the set screws 37 to prevent debris from entering the set screws 37.

The present invention contemplates that many changes and modifications may be made. Therefore, while forms of the improved push plug and branch assembly have been shown and described, and a number of alternatives discussed, persons skilled in this art will readily appreciate that various additional changes and modifications may be made without departing from the scope of the invention, as defined and differentiated by the following claims.

The invention claimed is:

1. A push plug type line stop branch assembly for use with a tapping sleeve disposed on a pipe, the assembly comprising:
- a branch configured and arranged for attachment to the tapping sleeve, the branch having a body with a flange extending outward from a top surface of the body, the branch having a bore defined therein, the bore defined by an inner wall having a first wall section having an inside diameter and a second wall section having an inside diameter smaller than the inside diameter of the first wall section, a horizontal wall section extends between the first and second wall sections to form a shoulder adjacent to the top entrance to the bore, the inner wall further comprises a transition wall section with a decreasing inside diameter and a third wall section disposed adjacent to the transition wall section, the third wall section having an inside diameter smaller than the inside diameter of the second wall section, the third wall section defines a sealing bore surface;
- a plug having a body with a first diameter, the plug having a lip with a second diameter that is greater than the first diameter, the plug having a first groove and a second groove defined therein, the plug configured and arranged to slide into the bore of the branch in a longitudinal direction until the lip on the plug engages with the shoulder in the branch, the plug configured such that when the plug engages with the shoulder, the top surface of the plug is disposed substantially level with the top surface of the branch and the position of the plug can be confirmed from a visual inspection of the top surface of the branch;
- an O-ring disposed in the first groove in the plug, the O-ring configured and arranged to provide a seal inside the bore when the plug is inserted into the bore of the branch such that the lip engages the shoulder; and,
- at least one set screw configured and arranged to extend through the branch into the second groove in the plug when the plug is inserted into the branch such that the lip engages with the shoulder.

2. The assembly of claim 1, wherein the branch is a unitary structure.

3. The assembly of claim 2, wherein the branch is forged.

4. The assembly of claim 2, wherein the branch is formed by casting.

5. The assembly of claim 1, wherein the first groove is annular.

6. The assembly of claim 1, wherein the second groove is annular.

7. The assembly of claim 1, wherein the plug is constructed of metal.

8. The assembly of claim 1, wherein the plug is constructed from a non-metallic material.

9. The assembly of claim 1, further comprising the branch having an opening defined therein for receiving one of the at least one set screws.

10. The assembly of claim 9, wherein the branch has internal threads disposed adjacent to the opening.

11. The assembly of claim 9, wherein the opening is sized to receive one of the at least one set screws and a cap for covering the at least one set screw.

12. A push plug type line stop branch assembly for use with a tapping sleeve disposed on a pipe, the assembly comprising:
- a branch configured and arranged for attachment to the tapping sleeve, the branch having a body with a flange extending outward from a top surface of the body, the branch having a bore defined therein, the bore defined by an inner wall having a first wall section having an inside diameter and a second wall section having an inside diameter smaller than the inside diameter of the first wall section, a generally horizontal wall section extends between the first and second wall sections to form a shoulder adjacent to the top entrance to the bore;
- a plug having a body with a first diameter, the plug having a lip with a second diameter that is greater than the first diameter, the plug having a first groove and a second groove defined therein, the plug configured and arranged to slide into the bore of the branch in a longitudinal direction until the lip on the plug engages with the shoulder in the branch, the plug configured such that when the plug engages with the shoulder, the top surface of the plug is disposed substantially level with the top surface of the branch and the position of the plug can be confirmed from a visual inspection of the top surface of the branch;
- an O-ring disposed in the first groove in the plug, the O-ring configured and arranged to provide a seal inside the bore when the plug is inserted into the bore of the branch such that the lip engages the shoulder; and,
- at least one set screw configured and arranged to extend through the branch into the second groove in the plug when the plug is inserted into the branch such that the lip engages with the shoulder.

13. The assembly of claim 12, wherein the branch is a unitary structure.

14. The assembly of claim 13, wherein the branch is forged.

15. The assembly of claim 13, wherein the branch is formed by casting.

16. The assembly of claim 12, wherein the first groove is annular.

17. The assembly of claim 12, wherein the second groove is annular.

18. The assembly of claim 12, further comprising the branch having an opening defined therein for receiving one of the at least one set screws.

19. The assembly of claim 18, wherein the opening is sized to receive one of the at least one set screws and a cap for covering the at least one set screw.

20. A push plug type line stop branch assembly for use with a tapping sleeve disposed on a pipe, the assembly comprising:
- a branch configured and arranged for attachment to the tapping sleeve, the branch having a body with a flange extending outward from a top surface of the body, the branch having a bore defined therein, the bore defined by an inner wall having a first wall section having an inside diameter and a second wall section having an inside diameter smaller than the inside diameter of the first wall section, a generally horizontal wall section extends between the first and second wall sections to form a shoulder adjacent to the top entrance to the bore; and,
- a plug having a body with a first diameter, the plug having a lip with a second diameter that is greater than the first diameter, the plug configured and arranged to slide into the bore of the branch in a longitudinal direction until the lip on the plug engages with the shoulder in the branch, the plug configured such that when the plug engages with the shoulder, the top surface of the plug is disposed substantially level with the top surface of the branch and the position of the plug can be confirmed from a visual inspection of the top surface of the branch.

* * * * *